United States Patent
Meyrick et al.

(10) Patent No.: US 6,200,371 B1
(45) Date of Patent: *Mar. 13, 2001

(54) AQUEOUS INK COMPOSITIONS

(75) Inventors: Barry Huston Meyrick, Manchester; Mark Holbrook, Bury; Roy Bradbury, St. Helens, all of (GB)

(73) Assignee: Zeneca Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,547

(22) PCT Filed: Sep. 19, 1997

(86) PCT No.: PCT/GB97/02547

§ 371 Date: Mar. 30, 1999

§ 102(e) Date: Mar. 30, 1999

(87) PCT Pub. No.: WO98/14523

PCT Pub. Date: Apr. 9, 1998

(30) Foreign Application Priority Data

Oct. 1, 1996 (GB) .................................... 9620445
May 7, 1997 (GB) .................................... 9709127

(51) Int. Cl.⁷ .......................... C09D 11/02; C09B 29/036
(52) U.S. Cl. .......................... 106/31.5; 534/753; 534/794
(58) Field of Search .......................... 106/31.5; 534/753, 534/794

(56) References Cited

U.S. PATENT DOCUMENTS

| | | | |
|---|---|---|---|
| 4,065,447 | * 12/1977 | Jotterand | 534/794 |
| 4,148,770 | 4/1979 | Stahle et al. | 428/260 |
| 4,271,071 | * 6/1981 | Clark | 534/794 |
| 4,388,115 | 6/1983 | Sugiyama et al. | 106/31.5 |
| 4,650,861 | * 3/1987 | Weaver et al. | 534/794 |
| 4,680,332 | 7/1987 | Hair et al. | 524/377 |
| 4,804,719 | 2/1989 | Weaver et al. | 525/420 |
| 4,929,277 | * 5/1990 | Tanaka et al. | 106/31.5 |
| 5,006,598 | 4/1991 | Adams et al. | 524/601 |
| 5,028,262 | 7/1991 | Barlow, Jr. et al. | 106/31.27 |
| 5,132,275 | 7/1992 | Chapman et al. | 503/227 |
| 5,226,957 | 7/1993 | Wickramanayake et al. | 106/31.25 |
| 5,336,714 | 8/1994 | Krutak et al. | 524/608 |
| 5,342,440 | 8/1994 | Wickramanayake | 106/31.25 |
| 5,446,136 | * 8/1995 | Pape et al. | 534/794 |
| 5,502,172 | * 3/1996 | Pape et al. | 534/794 |
| 5,518,983 | 5/1996 | Bradbury et al. | 503/227 |
| 5,531,816 | 7/1996 | Wickramanayake | 106/31.6 |
| 5,565,022 | 10/1996 | Wickramanayake | 106/31.27 |
| 5,614,008 | 3/1997 | Escano et al. | 528/275 |
| 5,665,151 | 9/1997 | Escano et al. | 106/31.15 |
| 5,837,754 | 11/1998 | Shimomura et al. | 523/161 |

FOREIGN PATENT DOCUMENTS

| | | |
|---|---|---|
| 351328 | 1/1990 | (EP) . |
| 763577 | 3/1997 | (EP) . |
| 2297231 | 8/1976 | (FR) . |
| 2311820 | 12/1976 | (FR) . |
| 2161495 | 1/1986 | (GB) . |
| 7-196965 | 8/1995 | (JP) . |
| 9106608 | 5/1991 | (WO) . |
| 9409073 | 4/1994 | (WO) . |
| 9528286 | 10/1995 | (WO) . |
| 9534024 | 12/1995 | (WO) . |
| 9603467 | 2/1996 | (WO) . |
| 9706217 | 2/1997 | (WO) . |

OTHER PUBLICATIONS

International Search Report dated Jan. 26, 1998.

* cited by examiner

*Primary Examiner*—Helene Klemanski
(74) *Attorney, Agent, or Firm*—Rothwell, Figg, Ernst & Manbeck

(57) ABSTRACT

An ink comprising water, a water-dissipatable polymer and a dye of the Formula (1):

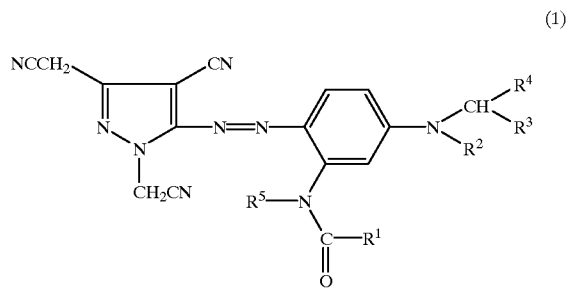

wherein:

$R^1$ is optionally substituted alkyl or optionally substituted aryl;

$R^2$ is H, optionally substituted alkyl or optionally substituted aryl;

$R^5$ is H or optionally substituted alkyl; and $R^3$ and $R^4$ are each independently optionally substituted alkyl or optionally substituted aryl, or $R^3$ and $R^4$ together with the CH group to which they are attached from an optionally substituted 5- or 6- membered ring. Also claimed are dyes and ink jet printing processes.

19 Claims, No Drawings

AQUEOUS INK COMPOSITIONS

This invention relates to inks and to their use in ink jet printing.

Ink jet printing methods involve printing an image onto a substrate using ink droplets emitted from a small nozzle without bringing the nozzle into contact with the substrate. Over recent years ink jet printers have become popular because they are quieter and more versatile than impact printers, for example conventional basket typewriters are noisy and the images they can print are restricted to the shapes moulded onto the end of each mechanical lever. The most popular ink jet printers are the thermal and piezoelectric.

The requirements for inks used in ink jet printers include:
  i) they should not clog the small nozzle from which they are emitted, or form a blocking crust over the end,
  ii) the resultant image should have good water-fastness so that it does not smudge excessively on contact with sweat or water,
  iii) the image should also have a good light-fastness so that it does not fade quickly on exposure to daylight,
  iv) they should dry quickly on paper and give discrete, sharp images,
  v) they should have good storage stability, and
  vi) they should have a high colour strength to give intensely coloured images.

WO91/06608 describes aqueous inks containing a polyester, water, a pigment and a wax. Whilst these inks are useful in printing presses, the pigments they contain require intensive and expensive milling to make them fine enough to pass through ink jet printer heads and the pigments have a tendency to settle out from the ink on standing for long periods. Furthermore, images formed from inks containing insoluble pigments are generally opaque and dull, particularly in the magenta shade area, limiting their usefulness on overhead projector slides.

There is a need for inks which are suitable for both thermal and piezo IJP, have high colour strength and produce images having a high light-fastness and water-fastness when printed on a substrate.

According to the present invention there is provided an ink comprising water, a water-dissipatable polymer and a dye of the Formula (1):

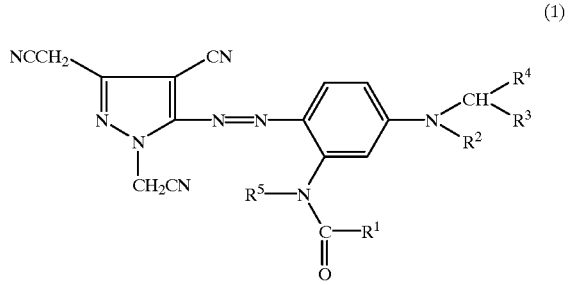

wherein:
  $R^1$ is optionally substituted alkyl or optionally substituted aryl;
  $R^2$ is H, optionally substituted alkyl or optionally substituted aryl;
  $R^5$ is H or optionally substituted alkyl; and
  $R^3$ and $R^4$ are each independently optionally substituted alkyl or optionally substituted aryl, or $R^3$ and $R^4$ together with the CH group to which they are attached from an optionally substituted 5- or 6- membered ring.

$R^1$ is preferably optionally substituted alkyl, more preferably optionally substituted $C_{1-4}$-alkyl, especially $C_{1-4}$-alkyl.

$R^2$ is preferably H or optionally substituted alkyl, more preferably optionally substituted alkyl, especially optionally substituted $C_{1-8}$-alkyl, more especially $C_{1-6}$-alkyl.

Preferably $R^3$ and $R^4$ are each independently optionally substituted alkyl, or $R^3$ and $R^4$ together with the CH group to which they are attached form an optionally substituted 5- or 6- membered ring.

When $R^3$ or $R^4$ is optionally substituted alkyl it is preferably optionally substituted $C_{1-8}$-alkyl, more preferably $C_{1-6}$-alkyl, especially $C_{2-4}$-alkyl.

When the group —CHR$^3$R$^4$ forms a 5- or 6-membered ring the ring is preferably a cyclohexyl or cyclopentyl ring.

Examples of preferred groups represented by —CHR$^3$R$^4$ include prop-2-yl, but-2-yl, pent-2-yl, pent-3-yl, hex-2-yl, hex-3-yl, hept-2-yl, cyclopentyl and cyclohexyl.

$R^5$ is preferably H or $C_{1-4}$-alkyl, more preferably H or methyl, especially H.

The optional substituents which may be present on $R^1$, $R^2$, $R^3$, $R^4$ and $R^5$ are preferably selected from $C_{1-4}$-alkoxy, especially methoxy; halo, especially Cl, Br or F; $C_{1-4}$-alkyl, especially methyl; nitro; cyano; —OCO($C_{1-4}$-alkyl); —CO$_2$($C_{1-4}$-alkyl); optionally substituted amino, especially —NR$^a$R$^b$ wherein R$^a$ and R$^b$ are each independently H, $C_{1-4}$-alkyl or $C_{1-4}$-alkyl substituted by hydroxy, carboxy or sulpho.

In a preferred embodiment $R^1$ is $C_{1-4}$-alkyl, $R^2$ is $C_{1-8}$-alkyl, $R^3$ and $R^4$ are each independently $C_{1-4}$-alkyl and $R^5$ is H.

A further feature of the invention provides dyes of Formula (1), as defined above.

Dyes of Formula (1) may be prepared by reacting the corresponding dye having a H atom on the pyrazole nitrogen atom with chloracetonitrile, preferably under alkaline conditions. The dye having a H atom on the pyrazole nitrogen atom may be prepared by diazotising a compound of Formula (2) and coupling the resultant diazonium salt to a compound of Formula (3):

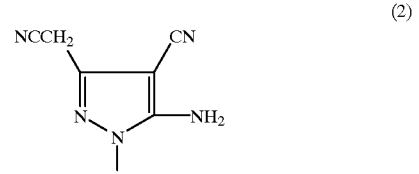

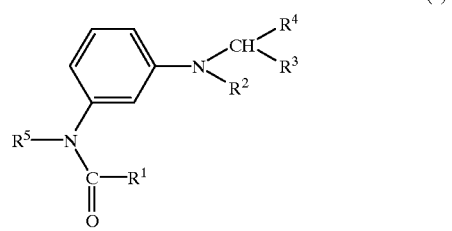

wherein $R^1$, $R^2$, $R^3$ and $R^4$ are as hereinbefore defined.

The diazotisation is preferably performed at a temperature below 6° C., e.g. −5° C. to +5° C. Typically sodium nitrite is used as the diazotising agent and the process is performed in the presence of dilute mineral acid, for example dilute hydrochloric acid.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e —C(=O)—O—) linking groups and may be prepared by a condensation polymerisation process in which an acid component (including ester-forming derivatives thereof is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g. carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3- propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris (hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

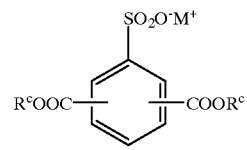

wherein M is a cation (preferably sodium, lithium or potassium); and each $R^c$ independently is H, a cation or $C_{1-4}$-alkyl (preferably methyl or ethyl). Preferred compounds of the above formula are of formula:

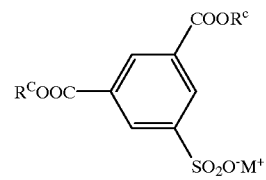

wherein M and $R^c$ are as defined above. Particularly preferred is the mono sodium salt (one $R^c$ is H, the other is Na), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

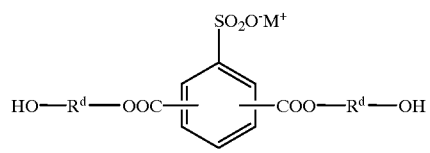

wherein M is as hereinbefore defined above and each $R^d$ independently is alkylene, preferably $C_{2-4}$-alkylene. Preferred compounds of the above formula are:

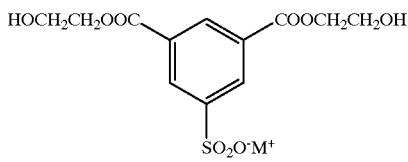

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g. an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although substituents would increase acid strength), with alkali metal ions such as $Na^+$, $Li^+$ and $K^+$ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethylene glycols and alkyl ethers of polyethylene glycols, examples of which include:

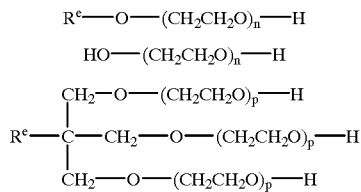

wherein $R^e$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1000 to 25,000, especially 2000 to 20,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The ink preferably has a pH of 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range −38° C. to 105° C., more preferably −20 to 70° C., especially −10° C. to 60° C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or communised solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

Water-dissipatable polyesters can also be purchased from Eastman Kodak Company and Zeneca Limited. Examples include Eastman AQ29D and AQ55W.

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth) acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

The dyed water-dissipatable polymer may be prepared by heating a water-dissipatable polymer and a dye of Formula (1) at an elevated temperature, for example at a temperature in the range 35 to 150° C., preferably from 40 to 90° C. Simply mixing the dye and polymer in water at room temperature leads to a slight up-take of colour but heating is usually necessary for a full dyeing.

Preferably inks according to the invention are prepared by mixing together (i) a solution of a dye of Formula (1) in a water-immiscible solvent and (ii) a mixture of a water-dissipatable polymer, water-miscible solvent and optionally water. Equally the inks may be prepared by mixing together (i) a solution of a dye of Formula (1) in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of dye by the polymer to give intensely coloured inks.

The amount of dye and water-dissipatable polymer contained in the ink will vary according to the depth of shade required. Typically, however, the ink will comprise:

(a) from 0.5 to 10 parts, more preferably 1 to 5 parts of a dye of Formula (1);

(b) from 2 to 25 parts, more preferably 5 to 15 parts of a water-dissipatable polymer;

(c) from 40 to 90 parts, more preferably from 50 to 80 parts of water; and (d) from 0 to 60 parts, more preferably 5 to 40 parts of organic solvent;

wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as 10 g of polymer.

The ink may also contain an organic solvent (as mentioned in (d) above) and this may be a mixture of organic solvents. In a preferred embodiment the ink contains an organic solvent consisting of a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate; di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy]ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents. Preferred water-miscible organic solvents are $C_{1\text{-}6}$-alkyl mono ethers of $C_{2\text{-}6}$-alkylene glycols and $C_{1\text{-}6}$-alkyl mono ethers of poly($C_{2\text{-}6}$-alkylene glycols).

Component (d) of the above mentioned inks preferably comprises;
  (i) 5 to 50% of a water-immiscible alcohol having at least six carbon atoms, (especially benzyl alcohol); and
  (ii) 50 to 95% of a water-miscible solvent comprising
    (a) a cyclic ester or cyclic amide (especially an optionally substituted pyrrolidone);
    (b) a water-miscible $C_{1\text{-}6}$-alkyl mono ether of a $C_{2\text{-}6}$-alkylene glycol or $C_{1\text{-}6}$-alkyl mono ether of poly($C_{2\text{-}6}$-alkylene glycol); or
    (c) a mixture of (a) and (b).
wherein all % are by weight and add up to 100%.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Use of dyes of Formula (1) has advantages over the use of pigments in that less dye is usually required than would be the case for a pigment, expensive milling is avoided, the inks are less likely to form a precipitate on standing, a far greater variety of shades are available and the resultant prints have good transparency. The latter quality is particularly important for the production of coloured substrates which require transparency, for example over-head projector slides and colour filters used in LCD television screens. The inks of the present invention also benefit from good light- and water-fastness.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

According to a further feature the present invention provides a process for printing an image on a substrate comprising applying thereto an ink comprising water, a water-dissipatable polymer and a dye of Formula (1) as hereinbefore defined, by means of an ink jet printer.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

The inks of the present invention may also be used for the preparation of colour filters, for example those used in flat bed displays.

The invention is further illustrated by the following examples in which all parts and percentages are by weight unless specified otherwise.

EXAMPLE 1

Stage 1—Preparation of a Water-Dissipatable Polyester

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mgKOH/g. At this point F and the remainder of D and I were charged and the temperature raised to 230° C. The reaction was continued under reduced pressure until an acid value of 2.8 mgKOH/g was obtained. The resin was further characterised by a hydroxyl value=19.7 mgKOH/g, ICI Cone and Plate viscosity @125° C.=90 poises and a Tg (onset)=4° C. The resin was readily dispersed in warm distilled water to give a clear solution having a solids content of 20% w/w.

| Monomer | Abbreviation | Weight (g) |
|---|---|---|
| neopentyl glycol | A | 653.47 |
| diethylene glycol | B | 479.21 |
| 1,6 hexane diol | C | 396.04 |
| isophthalic acid | D | 1584.16 |
| sodio-5-sulpho-isophthalic acid | E | 396.04 |
| adipic acid | F | 198.02 |
| methoxy PEG 750 | G | 396.04 |
| sodium acetate | H | 8 |
| Fascat 4101 | I | 4 |

Stage 2

A dye of the formula shown below:

Dye 1

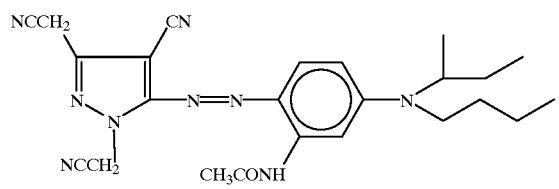

was prepared by using stages 2a to 2e described below.

Stage 2a

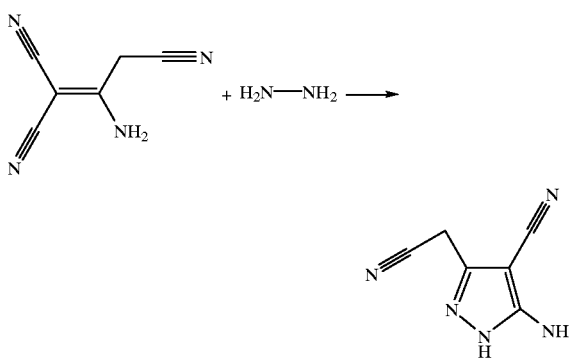

2-Amino-1,1,3-tricyanopropene (66 g) was suspended in ethanol (500 ml) at 5° C. A solution of hydrazine hydrate (25 ml) in water (25 ml) was then added dropwise over 30 mins at 5–10° C. After heating under reflux for 30 mins the reaction mixture was cooled to room temperature and the crystalline product was isolated by filtration, washed well with water and dried.

Stage 2b–3-(N-sec-butylamino)acetanilide

3-Aminoacetanilide (186.2 g), 2-bromobutane (198 g), triethylamine (150 g) and ethanol (1 litre) were heated under reflux for 64 hrs. After cooling to room temperature the reaction mixture was filtered to remove triethylamine hydrochloride and the solvent evaporated under reduced pressure to leave a dark oil which was purified by chromatography on silica gel. The product was crystallised by trituration under hexane.

Stage 2c–3-(N-n-butyl-N-sec-butylamino) Acetanilide

The product from Stage 2b (20.6 g), 1-bromobutane (63.7 g) and anhydrous potassium carbonate (13.8 g) were stirred and heated under reflux for 36 hours. The cooled reaction mixture was diluted with methanol (50 ml) and filtered to remove the inorganic salts. Evaporation of the excess bromobutane and methanol under reduced pressure gave a viscous oil which was purified by chromatography on silica gel.

Stage 2d—Preparation of

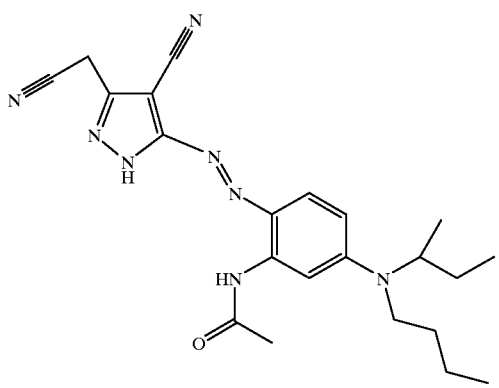

The product from Stage 2a (14.72 g) was suspended in a mixture of acetic acid (400 ml) and hydrochloric acid (60 ml) at 0–5° C. A solution of sodium nitrite (8 g) in the minimum of water was then added over 20 minutes. On completion of the addition the solution was stirred for a further 30 minutes and the excess nitrous acid destroyed by the addition of saturated sulphamic acid solution. The resultant diazonium salt solution was then added slowly to a solution the product from Stage 2c (26.4 g) in ethanol (500 ml) to which potassium acetate (50 g) had been added. After stirring for a further 60 minutes, water (800 ml) was added, and the product was isolated by filtration, washed well with water and dried.

Stage 2e—Preparation of Dye 1

The product from Stage 2d (21 g), chloroacetonitrile (5 ml), 2-butanone (250 ml), water (50 ml) and sodium hydrogen carbonate (4.2 g) were stirred and heated under reflux for 4 hrs. After diluting with water (1 litre) the crude product was isolated by extracting into dichloromethane and purified by column chromatography on silica gel eluting with ethyl acetate/hexane (1:1) to give Dye 1 as a red crystalline solid.

Stage 3—Ink Preparation

Dye 1 (1 g) was dissolved in a mixture of benzyl alcohol (10 g) and 2-pyrrolidone (20 g) using sonification. The water-dissipatable polyester resulting from Stage 1 (50 g of 20% solids) was dissipated in a further 19 ml of water and the mixed with the dye solution and shaken to give a homogenous ink.

The final ink had the formulation:

| Component | Weight (g) |
|---|---|
| Dye 1 | 1 |
| polyester from stage 1 | 50 g (20% w/w in water) |
| Benzyl alcohol | 10 |
| 2-pyrrolidone | 20 |
| Water | 19 |
|  | 100 |

EXAMPLE 2

Ink Jet Printing

The ink described in Example 1 was printed onto 3 commercially available plain papers, as described below, using a Hewlett Packard thermal ink jet printer. The resultant prints had very good colour strength and brightness (chroma) as indicated in Table 1.

The prints were irradiated with light using an Atlas Ci35 Weatherometer and the colour change ($\Delta E$) measured after the time indicated in Table 1.

Paper XA is Xerox 4024 from Rank Xerox

Paper GB is Gilbert Bond from the Mead Corporation

Paper WC is Conqueror Hight White Wove 100 g/m$^2$ from Arjo Wiggins Appleton.

TABLE 1

| Paper | ROD | Chroma | $\Delta E$ |
|---|---|---|---|
| XA | 0.99 | 62.05 | 4.15 @ 24 hours |
|  |  |  | 7.23 @ 48 hours |

TABLE 1-continued

| Paper | ROD | Chroma | ΔE |
|---|---|---|---|
| | | | 10.71 @ 72 hours |
| | | | 14.93 @ 100 hours |
| GB | 1.088 | 64.95 | 3.25 @ 24 hours |
| | | | 6.75 @ 48 hours |
| | | | 9.73 @ 72 hours |
| | | | 11.21 @ 100 hours |
| WC | 1.187 | 66.79 | 4.69 @ 24 hours |
| | | | 7.99 @ 48 hours |
| | | | 12.27 @ 72 hours |
| | | | 16.01 @ 100 hours |

EXAMPLES 3 to 8

Stage 1—Dyes

Example 1 may be repeated except that in stage 2d in place of the product from 2c (i.e. 3-(N-n-butyl-N-sec-butylamino)acetanilide) there is used the substituted aniline shown below wherein substituents $R^1$ to $R^5$ are as shown in Table 2. The resultant dye is of Formula (1) wherein $R^1$ to $R^5$ is as defined in Table 2.

TABLE 2

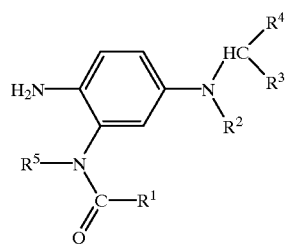

| Example | $R^1$ | $R^2$ | $R^3$ | $R^4$ | $R^5$ |
|---|---|---|---|---|---|
| 3 | CH₃ | n-butyl | ethyl | ethyl | H |
| 4 | n-propyl | n-butyl | CH₃ | ethyl | H |
| 5 | CH₃ | n-butyl | CH₃ | phenyl | H |
| 6 | CH₃ | n-propyl | CH₃ | CH₃ | H |
| 7 | CH₃ | ethyl | CH₃ | CH₃ | CH₃ |
| 8 | CH₃ | ethyl | CHR⁴R³ = cyclohexyl | | H |

Each of the above dyes may be converted to inks using the method of Example 1, Stage 3. Each of the resultant inks may be printed onto papers using the method of Example 2.

Comparative Example A (Isomer of Example 1)

Stage 1—Dye

A dye of the formula:

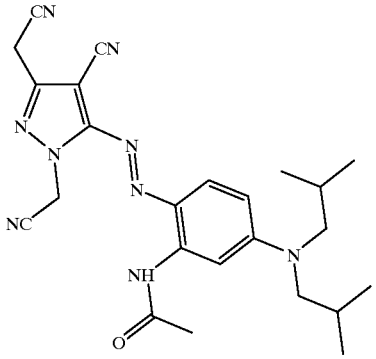

Dye 2 was prepared using the method of Example 1, Stages 2 and 2d except that in stage 2d there was used 3-(N,N-di(2-methylpropyl)amino)acetanilide.

Stage 2—Ink

An ink was prepared according to the method of Example 1, stage 3, except that in place of Dye 1 there was used Dye 2 (1 g).

Stage 3—Ink Jet Printing

The ink resulting from stage 2 was printed onto Xerox acid paper and the light fastness was found to be poorer than for the ink of Example 1.

Comparative Example B (another Isomer of Example 1)

A dye of the formula:

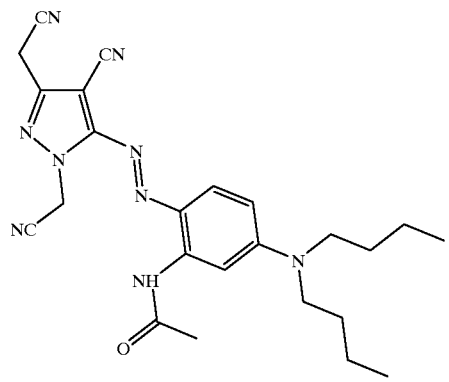

Dye 3 was prepared using the method of Example 1, Stages 2 and 2d except that in stage 2d there was used 3-(N,N-di(n-butyl)amino)acetanilide.

Stage 2—Ink

An ink was prepared according to the method of Example 1, stage 3, except that in place of Dye 1 there was used Dye 3 (1 g).

Stage 3—Ink Jet Printing

The ink resulting from stage 2 was printed onto Xerox acid paper and the light fastness was found to be poorer than for the ink of Example 1.

What is claimed is:

1. An ink comprising water, a water-dissipatable polymer and a dye of the Formula (1)

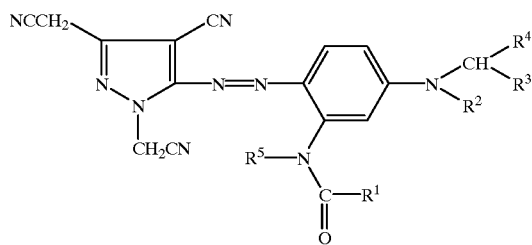

(1)

wherein:
R$^1$ is optionally substituted alkyl or optionally substituted aryl;
R$^2$ is H, optionally substituted alkyl or optionally substituted aryl;
R$^5$ is H or optionally substituted alkyl; and
R$^3$ and R$^4$ are each independently optionally substituted alkyl or optionally substituted aryl, or R$^3$ and R$^4$ together with the CH group to which they are attached from an optionally substituted 5- or 6- membered ring.

2. An ink according to claim 1 wherein R$^1$ is optionally substituted alkyl.

3. An ink according to claim 1 or 2 wherein R$^1$ is C$_{1-4}$-alkyl.

4. An ink according to claim 1 wherein R$^2$ is optionally substituted C$_{1-8}$-alkyl.

5. An ink according to claim 1, 2 or 4 wherein R$^3$ and R$^4$ are each independently optionally substituted alkyl, or R$^3$ and R$^4$ together with the CH group to which they are attached form an optionally substituted 5- or 6- membered ring.

6. An ink according to claim 5, wherein the water-dissipatable polymer is a water-dissipatable polyester.

7. An ink according to claim 1 or 2 wherein R$^3$ and R$^4$ are each independently optionally substituted C$_{1-8}$-alkyl.

8. An ink according to claim 1, 2 or 4 wherein the group of formula —CHR$^3$R$^4$ is prop-2-yl, but-2-yl, pent-2-yl, pent-3-yl, hex-2-yl, hex-3-yl, hept-2-yl, cyclopentyl or cyclohexyl.

9. An ink according to claim 1 wherein R$^1$ is C$_{1-4}$-alkyl, R$^2$ is C$_{1-8}$-alkyl, R$^3$ and R$^4$ are each independently C$_{1-6}$-alkyl and R$^5$ is H.

10. An ink according to claim 1, 2, 4 or 9 wherein the water-dissipatable polymer is a water-dissipatable polyester.

11. An ink according to claim 10 wherein the water-dissipatable polyester bears ionised sulphonate and/or carboxy groups.

12. An ink according to claim 10 wherein the water-dissipatable polyester has an Mn of up to 30,000.

13. An ink according to claim 11 wherein the water-dissipatable polyester has an Mn of up to 30,000.

14. An ink according to claim 1, 2, 4 or 9 comprising:
(a) from 0.5 to 10 parts of the dye of Formula (1);
(b) from 2 to 25 parts of the water-dissipatable polymer;
(c) from 40 to 90 parts of water; and
(d) from 0 to 60 parts of an organic solvent;
wherein all parts are by weight and the total number of parts of (a)+(b)+(c)+(d) add up to 100.

15. An ink according to claim 1 which contains a water-miscible organic solvent and a water-immiscible organic solvent.

16. A dye of Formula (1):

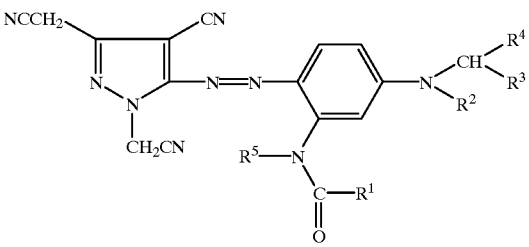

(1)

wherein:
R$^1$ is optionally substituted alkyl or optionally substituted aryl;
R$^2$ is H, optionally substituted alkyl or optionally substituted aryl;
R$^5$ is H or optionally substituted alkyl; and
R$^3$ and R$^4$ are each independently optionally substituted alkyl or optionally substituted aryl, or R$^3$ and R$^4$ together with the CH group to which they are attached from an optionally substituted 5- or 6- membered ring.

17. A dye according to claim 16 wherein R$^1$ is C$_{1-4}$-alkyl, R$^2$ is C$_{1-8}$-alkyl, R$^3$ and R$^4$ are each independently C$_{1-6}$-alkyl and R$^5$ is H.

18. A process for printing an image on a substrate comprising applying thereto an ink according to claim 1, 2, 4, 9 or 15 by means of an ink jet printer.

19. A process for printing an image on a substrate comprising applying thereto an ink according to claim 5 by means of an ink printer.

* * * * *